United States Patent [19]
Kuchel

[11] Patent Number: 5,054,912
[45] Date of Patent: Oct. 8, 1991

[54] OPTICAL DISTANCE-MEASURING DEVICE

[75] Inventor: Michael Kuchel, Oberkochen, Fed. Rep. of Germany

[73] Assignee: Carl-Zeiss-Stiftung, Heidenheim/Brenz, Fed. Rep. of Germany

[21] Appl. No.: 609,584

[22] Filed: Nov. 6, 1990

[30] Foreign Application Priority Data

Nov. 9, 1989 [DE] Fed. Rep. of Germany ....... 3937268

[51] Int. Cl.$^5$ ................................................ G01C 3/08
[52] U.S. Cl. ......................................... 356/5; 356/349
[58] Field of Search ...................... 356/5, 349; 342/127

[56] References Cited

U.S. PATENT DOCUMENTS

| | | | |
|---|---|---|---|
| 3,619,057 | 11/1971 | Castellano et al. | 356/5 |
| 4,163,954 | 8/1979 | Hayes | 356/5 X |
| 4,666,295 | 5/1987 | Duvall, III et al. | 356/5 |
| 4,744,653 | 5/1988 | Sano et al. | 356/5 |

FOREIGN PATENT DOCUMENTS 2043734 6/1973 Fed. Rep. of Germany .
8808519 11/1988 PCT Int'l Appl. .

OTHER PUBLICATIONS

"Die Aufgaben der Elektronik im Reg Elta 14", Rudiger Bornefeld, Zeiss Informationen, Carl Zeiss, Oberkochen, West Germany, vol. 20, No. 80, pp. 24–26, 1972.
"Two-wavelength laser interferometry using Superheterodyne detection", R. Dandliker, R. Thalmann, and D. Prongue, Optics Letters, vol. 13, No. 5, pp. 339–341, 1988.
"Dokumentation Laser interferometrie der Langenmesstechnik", VDI-Verlag Dusseldorf, pp. 8–10, 1985.

Primary Examiner—Linda J. Wallace
Attorney, Agent, or Firm—Eugene Stephens & Associates

[57] ABSTRACT

The invention relates to an optical rangefinding device which consists of two frequency-stabilized multi-mode lasers. Two modes of each laser are superimposed so that each laser generates its own respective amplitude-modulated beam; and each beam is used, alternately, as the measuring light beam. The amplitude-modulation frequencies are selected so that the electronic detection of the two amplitude-modulated light beams, followed by electronic mixing of the individually detected signals, generates an electronic pulse train having a difference frequency which is only a fraction of the two modulation frequencies. The emitted and reflected frequencies of each of these amplitude-modulated beams are phase-compared. Each of these phase comparisons and the difference between them are used to determine distance to the target. Since phase shifts are digitally measured at the relatively low difference frequency by a digital clock rate based upon the relatively high frequency-modulated signal of one of the lasers, phase shift is determined with high accuracy. Further, the device provides measurements having a relatively accuracy which corresponds to the difference in wavelengths of the two amplitude-modulated beams which, in turn, have an accuracy corresponding to the spectral sharpness of the frequency-stabilized lasers.

13 Claims, 3 Drawing Sheets

OPTICAL DISTANCE-MEASURING DEVICE

TECHNICAL FIELD

The invention relates to an optical rangefinder in which an emitted light beam is directed to the target and distance is determined by detecting the phase shift between the emitted light and the light reflected by said target.

BACKGROUND

Presently, such optical rangefinders are used when distances of a few 100 meters are to be measured accurately and rapidly. Because there are no electronic detectors capable of directly registering the frequency of visible or infrared measuring light, these distance-measuring devices operate with amplitude-modulated light rays.

Examples of such measuring devices are the electronic tachymeters disclosed in "Zeiss-Informationen", Vol. 20, No. 80, page 24 (1972). These have a relatively simple optical configuration: a light-emitting diode (LED), operated via a frequency-stabilized electronic oscillator and an amplifier, generates an amplitude-modulated light beam. It is directed at the target, reflected by the latter, and received again by the device and detected. The detector signal and a reference signal from the amplifier are electronically mixed with the signal of another frequency-stabilized electronic oscillator. Then the phase difference between the detector signal and the reference signal is determined.

The measuring accuracy of such prior art tachymeters is approximately 1 mm over a measuring distance of a few 100 meters. This corresponds to a relative measuring accuracy of $5 \times 10^{-6}$. Further, only specularly-reflective bodies (as distinguished from diffusely-reflective bodies) are suitable as targets.

PCT Application No. WO 88/08519 (Dandliker) discloses a measuring device which uses a heterodyne interferometric arrangement and is capable of even greater measuring accuracy, but over shorter measuring distances. This device uses two frequency-stabilized laser beams of different frequencies. Using two acousto-optical modulators driven, respectively, by an electronic oscillator, a second laser beam is generated from each of the two laser beams. Each of these second beams is then superimposed upon its related initial beam to provide two amplitude-modulated laser beams which, in turn, are both superimposed on each other to form the measuring beam. The inventors of this prior art measuring device have confirmed that its accuracy is a function of the target, the accuracy being lower with diffusely-reflecting targets than with specularly-reflected targets. [See R. Dandliker et al., Optics Letters, Vol. 13, No. 5, page 339 (1988)].

It is also known to utilize the high spectral sharpness of multi-mode lasers in interferometric linear measurement, and such interferometric devices provide measurements with a relatively high accuracy, e.g., greater than $10^{-6}$. Different, and sometimes very simple, methods of stabilizing spectral line sharpness in such lasers are well known, some assuring a spectral accuracy of $\Delta f/f < 10^{-7}$. A few of these known methods are described in "Dokumentation Laserinterferometrie der Langenmesstechnik" (documentation of laser interferometry in linear measuring technology), published in VDI-Verlag Dusseldorf, 1985, page 8 and the following. Also, German Patent 20 43 734 discloses a particularly simple stabilizing method in which both modes of a two-mode gas laser are divided by polarization optics and their intensities are measured. A closed-loop control circuit controls the laser-initiating discharge current in such a manner that the intensity ratio of both modes remains constant. Nonetheless, all such known interferometric devices using multi-mode lasers require a highly reflective target, usually in the form of triple reflectors; and when diffusely-reflecting targets are used, the intensity of the reflected light is very low, and the phase of the measuring light beam is decorrelated following the diffuse reflection.

Quite generally, the relative measuring accuracy of such optical devices depends upon (a) the accuracy of the measurement of the relative phase difference between two measuring signals, and upon (b) the spectral stability of the amplitude-modulated light. If a distance (s) is to be determined with an accuracy of ($\Delta s$), the unsharpness of the spectral line ($\Delta f/f$) of the modulation frequency (f) must not be greater than the desired lateral accuracy ($\Delta s/s$), i.e.,:

$$\Delta f/f \leq \Delta s/s$$

Therefore, if a measuring accuracy ($\Delta s$) of 0.1 mm is desired over a distance (s) of 300 meters, the electronic measurement of the phase shift must be based upon a spectral line accuracy ($\Delta f/f$) of at least $3.3 \times 10^{-7}$. In order to obtain frequencies with such spectral accuracy, very complex and expensive oscillators are required.

The invention herein is a measuring device of the above-mentioned type which provides identical measuring accuracy with diffusely-reflecting, as well as specularly-reflecting, targets. In addition, since the inventive device omits the use of frequency-stabilized electronic oscillators, it is less expensive, and yet it provides measurements with a relative error of less than $10^{-6}$ with measuring times of less than 100 ms.

SUMMARY OF THE INVENTION

My distance-measuring device uses a light source which consists of two frequency-stabilized multi-mode lasers. Each of the two frequency-stabilized lasers emits several modes of high spectral sharpness. The frequency spacing between any two modes of each laser exhibits the same spectral sharpness as each individual mode, being stabilized by the very simple method disclosed in German Patent 20 43 734. In my device, at least two modes of each laser are superimposed to generate a laser beam that exhibits an amplitude-modulation frequency corresponding to the frequency spacing between the superimposed modes. Therefore, each laser generates its own respective amplitude-modulated beam, these two beams having respective frequencies ($\Delta_1$ and $\Delta f_2$). These two laser-generated frequencies are selected so that the ratio of the two frequencies ($\Delta f_1/\Delta f_2$) is different from a whole number by an amount which is small relative to the number 1. Preferably, $\Delta f_1/\Delta f_2$ should differ from the number 1 by less than one percent.

If the multiple modes of a laser are determined by different longitudinal modes of a resonator, the frequency spacing can vary over a range from 100 MHz to 10 GHz, depending on the length of the resonator. For example, in a HeNe laser having a resonator length of 25 cm, two adjacent longitudinal modes can exhibit a frequency spacing of 600 MHz.

With presently-available standard electronics, it is possible to determine with great accuracy the phases of electronic pulse trains with frequencies up to approximately 1 MHz. Therefore, the frequency spacings of my two lasers are adjusted (by the process just indicated above), so that the electronic detection of the two amplitude-modulated light beams, followed by electronic mixing of the individually detected signals, generates an electronic pulse train having a frequency which is only a fraction of the two modulation frequencies, namely, a frequency less than 1 MHz. Since phase shifts are measured at this difference frequency ($\Delta f_{12} = \Delta f_1 - \Delta f_2$), phase shift is determined with high accuracy. In this regard, a detector signal may optionally be mixed with itself for further frequency reduction.

In the preferred embodiment of the invention, each of the two lasers has two modes, since the proportion of laser light utilized as measuring light is greatest when each laser has two modes. The two stabilized and amplitude-modulated laser beams, generated by the superimposed modes of each laser, are alternately directed at the target, being switched at regular intervals by an appropriate switching system which, in the preferred embodiment, is merely a simple mechanical chopper. Three photo-detectors are used to generate electronic pulse trains corresponding to the frequency of the two amplitude-modulated beams. The first detector receives a portion of the amplitude-modulated laser beam which is being directed at the target (e.g., $\Delta f_1$), while the second detector receives a portion of the amplitude-modulated beam of the other laser (e.g., $\Delta f_2$). The third detector receives light reflected from the target, which may be either specularly or diffusely reflective.

The electronic signals generated by the first and third detectors are each individually mixed with the signal generated by the second detector. In this manner, the frequency of the detection signals relating to the directed and reflected beams are both significantly reduced to a much lower frequency ($\Delta f_{12}$) equal to the difference between the two mixed signals ($\Delta f_1 - \Delta f_2$). As indicated above, this lower frequency greatly facilitates the electronic measurement of phase differences between the emitted and reflected light of the first laser.

Thereafter, the switching system referred to above alternates, causing the beam of the second laser ($\Delta f_2$) to be directed to the first detector and the target, while causing the beam of the first laser ($\Delta f_1$) to be directed to the second detector. The third detector, receiving the reflections from the target, also receives the amplitude-modulated beam of the second laser ($\Delta f_2$). Since the electronic pulse trains from the first and third detectors are again mixed with the signal generated by the second detector, the frequency of these pulse trains is also reduced to $\Delta f_{12}$ to facilitate measurement of the phase shift between the emitted and reflected beams.

Distance is determined from at least two measurements of the phase differences between the signals generated by the first and third detectors for each of the two amplitude-modulated laser beams. That is, two distinct phase shift calculations are made: one is based upon the phase shift ($\phi_1$) of the first beam ($\Delta f_1$) when it is directed at the target, and the second calculation is based upon the phase shift ($\Delta_2$) of the second beam ($\Delta f_2$) when it is being directed at the target. Since the frequencies of these two beams are quite close, their respective wavelengths vary only slightly from each other. In a preferred example disclosed below, the two wavelengths vary by only 0.4 mm.

Distance to the target is determined by two calculations using the phase-shift measurements ($\phi_1$ and $\phi_2$) just referred to above. First, the difference between these measurements ($\phi_2 - \phi_1$) is used to calculate the number of whole cycles (N) each of the respective measuring beams has experienced during its respective travels to and from the target. Once N is calculated, the distance to the target is then determined with high accuracy using one of the two phase-shift measurements.

In order to be certain that the measurement correlated to the two phase differences is unique (i.e., that it cannot be representative of more than one possible distance), it is essential that the number of full wavelengths travelled by each of the two measuring beams do not differ from each other by more than one whole number. This will be assured so long as the total distance travelled by the reflected beams is less than the wavelength of the frequency difference ($\Delta f_{12}$) between the two beams. That is, if the distance to the target is equal to or less than one-half of this wavelength, the calculated distance becomes unique. Therefore, the unique range (L) is given by $$L = \tfrac{1}{2} \times (c/\Delta f_{12})$$

where c denotes the velocity of light. If the distance to the target is equal to, or less than, the unique range (L), each of the beams will have cycled through the same whole number of cycles during their respective travels to and from the target. This is true because, in order to create one full wavelength of the difference frequency, the two beams must differ from each other by one full cycle.

My simple measuring device encompasses a larger unique measuring range (L) than those provided by prior art interferometric measuring devices. Although the interferometric measuring device disclosed in the Dandliker application WO 88/08519 could have a similarly large unique range, this can be obtained only when at least one of its optical laser frequencies can be tuned.

In order to attain more reliable measuring results, automatic compensation can be provided for any phase drifts between the detectors resulting, for example, from changes in the signal-processing times of the detectors due to temperature changes. To compensate for such phase drifts, the third detector alternately receives (a) a portion of the light beam being directed at the target and (b) the light reflected from the target. Again, a mechanical chopper may be used to accomplish such alternation.

In another feature of the invention, the clock frequency of the digital phasemeter is provided by the amplitude-modulated frequency of one of the two lasers, and this high clocking rate results in a high digital resolution. Furthermore, the clock rate is remarkably constant, since it is based upon the high spectral sharpness of the frequency spacing of the two modes of one laser.

DRAWINGS

DETAILED DESCRIPTION

Figure 1:
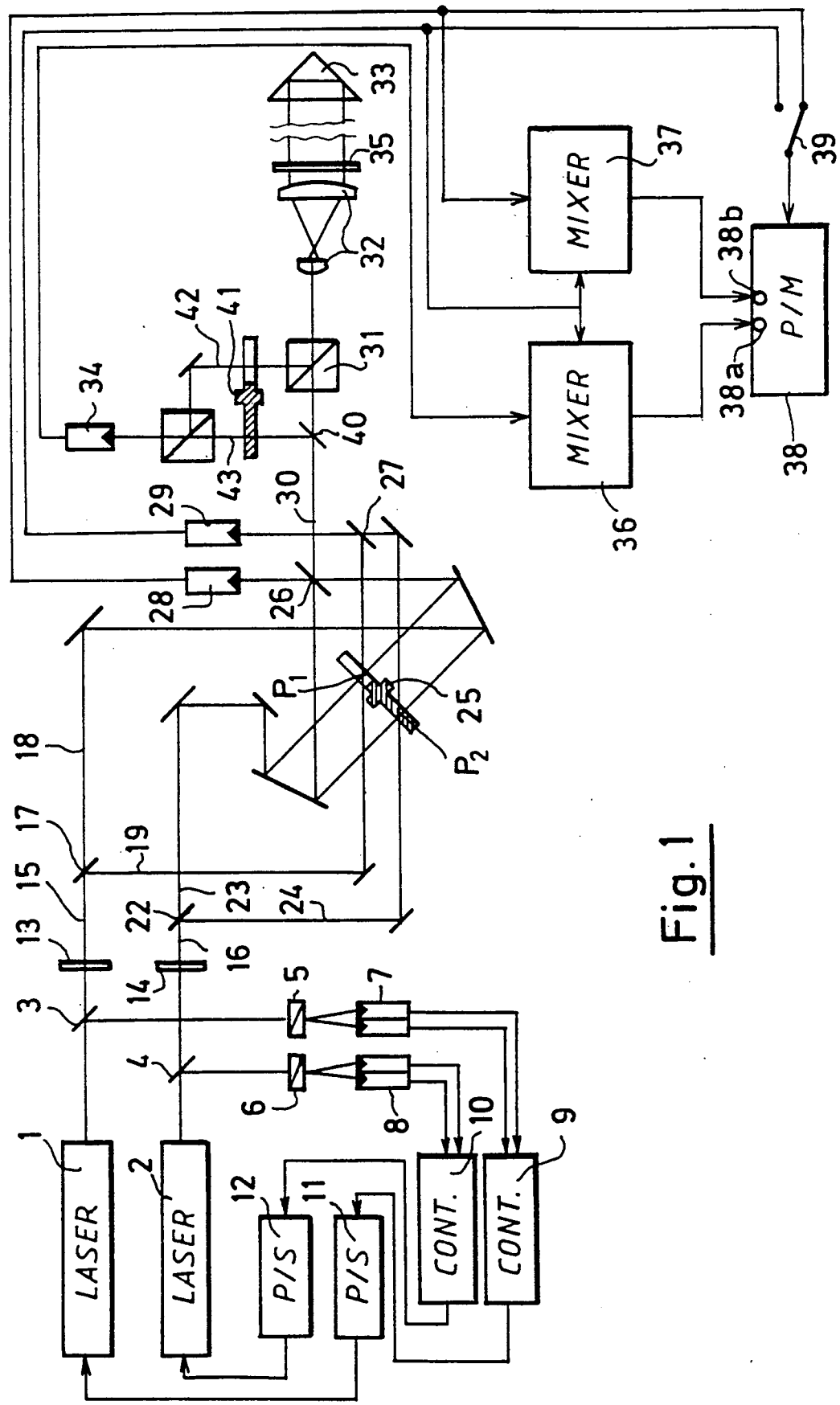
FIG. 1 is a schematic illustration of an optical distance-measuring device using two similar two-mode lasers according to the invention.

FIG. 1 shows two two-mode lasers 1 and 2, which will be described in detail hereinafter. To stabilize each laser, respective beam splitters 3, 4 direct a partial beam of each laser at respective Wollaston prisms 5, 6 which split the two modes of each laser beam depending on polarization. The split modes are detected separately by respective twin photodiodes 7, 8; and two controllers 9, 10 control the discharge current of each respective laser via laser power supplies 11, 12 in a manner such that, for each laser, its two modes have the same intensity. As a result of this, both lasers are stabilized at a spectral linear sharpness $\Delta f/f = 3 \times 10^{-8}$. This method of stabilization is described in detail in German Patent 20 43 734.

A first polarizing prism 13, which is at 45° relative to the directions of polarization of the two modes of laser 1, superimposes the laser's two modes so that they interfere with each other. This creates an amplitude-modulated light beam 15 with a modulation frequency $\Delta f_1$ determined by the frequency spacing between the two modes.

A second polarizing prism 14 similarly superimposes the two modes of laser 2 so that they interfere with each other to create a second amplitude-modulated light beam 16 having a modulation frequency $\Delta f_2$.

Two beam splitters 17, 22 split, respectively, the first amplitude-modulated wave 15 into two partial beams 18, 19 of equal intensity and the second amplitude-modulated wave 16 into two partial beams 23, 24 of equal intensity. Partial beam 19 of laser 1 and partial beam 23 of laser 2 bisect at a point $P_1$, while the two remaining partial beams 18, 24 similarly bisect at a second point $P_2$. A mechanical chopper 25 alternately allows light to pass either point $P_1$ or point $P_2$.

A third beam splitter 27, positioned along the path of rays behind chopper 25, alternately receives (a) partial beam 19 of laser 1 directed through point $P_1$ and then (b) partial beam 24 of laser 2 directed through point $P_2$, and alternately directs them to a photodiode 29.

A fourth beam splitter 26, also positioned behind chopper 25, alternately receives the other two partial beams 18, 23, directing a small portion of each of these alternately-received beams to another photodiode 28. The remaining larger portion of beams 18, 23 forms the measuring beam 30 which, during its further course, is emitted via a beam-splitting prism 31 and a telescope 32 to the target 33. Beam-splitting prism 31 redirects reflected light from target 33 to a third photodiode 34.

To prevent surface reflections from telescope 32 from reaching third photodiode 34, beam-splitting prism 31 is configured as a polarizing beam splitter. Behind telescope 32 is a quarter-wave plate 35. Light reflected specularly or diffusely by target 33 passes through the quarter-wave plate twice and, therefore, is polarized perpendicular to surface reflections from the telescope.

Calculation of the distance to the target is based upon the difference between two individually measured phase shifts $\phi_1$ and $\phi_2$ relating, respectively, to the emitted and reflected detections of each of the beams 18 and 23. A first measurement is made when mechanical chopper 25 is in the position shown in FIG. 1, allowing light to pass through point $P_1$. This causes photodiode 29 to receive amplitude-modulated beam 19 from laser 1 having a frequency of $\Delta f_1$, while photodiode 28 receives a portion of amplitude-modulated beam 23 from laser 2 having a frequency of $\Delta f_2$. Since the larger portion of beam 23 is emitted through telescope 32, photodiode 34 receives reflections of beam 23 from target 33 which also have an amplitude-modulation frequency of $\Delta f_2$. In other words, under the conditions illustrated in FIG. 1, photodiode 29 generates an electronic pulse train having a frequency $\Delta f_1$, while photodiode 28 generates an electronic signal of $\Delta f_2$, and photodiode 34 also generates a signal of $\Delta f_2$, this latter signal differing in phase with the signal generated by photodiode 28 by an amount $\phi_2$ determined by the distance to and from target 33.

Two electronic mixers 36, 37 receive the signals generated, respectively, by photodiodes 28, 34; and both also receive the signal generated by photodiode 29, each mixing the latter signal with the two respective former signals to generate two similar difference signals ($\Delta f_{12} = \Delta f_1 - \Delta f_2$). As just indicated above, these two $\Delta f_{12}$ signals differ in phase from each other; and they are delivered to a digital phasemeter 38 which measures this phase difference $\phi_2$, storing it momentarily.

Next, a second measurement is made as chopper 25 rotates to a position 180° from that shown in FIG. 1 and, thereby, alternates the measuring beam. At this time, photodiode 29 now receives beam 24 from laser 2 and, as a result of this change, produces an electronic signal of frequency $\Delta f_2$, while photodiode 28 receives a portion of beam 18 from laser 1, the larger portion of beam 18 continuing on to target 33. Therefore, the emitted measuring beam sensed by photodiode 28 and the reflected measuring light sensed by photodiode 34 both have the amplitude-modulated frequency $\Delta f_1$. Now, each of the mixers 36, 37, receiving, respectively, the signals from photodiodes 28, 34, mixes these $\Delta f_1$ signals with the $\Delta f_2$ signal from photodiode 29 and sends the difference signal $\Delta f_{12}$ on to phasemeter 38 for a second phase shift calculation. Although the distance to the target does not change between the first and second measurements, the phase shift is measured in each calculation by a slightly different timing interval. That is, since the frequency ($\Delta f_2$) of beam 23 differs only slightly from the frequency ($\Delta f_1$) of beam 18, the respective measured phase differences $\phi_2$ and $\phi_1$ differ very slightly in length.

To assure the constancy of the digital clock used by phasemeter 38, the stabilized and amplitude-modulated signal of laser 2 is used at all times as the clocking rate. Since this signal is alternately generated by detectors 28, 29 depending upon the position of chopper 25, a switch 39 is used to appropriately alternate the clock input to phasemeter 38 to coincide with the generation of the $\Delta f_2$ signal by these detectors.

As explained above, the phase differences $\phi_1$ and $\phi_2$ will provide unique measurements to the target so long as the target lies within the defined unique range L (see formula above). Within this unique range, the measured distance (s) to the target, measured in radians, can be written in terms of each of the two respective measuring frequencies, namely:

$$s = (N + \phi_1/2\pi) \times (c/2\Delta f_1) \quad (1)$$

$$s = (N + \phi_2/2\pi) \times (c/2\Delta f_2) \quad (2)$$

where N is an unknown integer, namely, the number of whole cycles the measuring beams have travelled to and from the target. By combining equations (1) and (2), it is possible to solve for N:

$$N = \tfrac{1}{2}\pi \times (\phi_1 \Delta f_1/\Delta f_{12} - \phi_2 \Delta f_2/\Delta f_{12}) \quad (3)$$

After calculating N, the distance (s) to the target is determined by using either of the equations (1) or (2). The digital accuracy (Δs) of the distance-measuring value is given by the following:

$$\Delta s = \pm c(\Delta f_1 - \Delta f_2)/2(\Delta f_1 \times \Delta f_2)$$

As already mentioned above, the maximum achievable relative measuring accuracy (Δs/s) is a function of the spectral linear sharpness (Δf/f) of the modulation frequency, while the digital measuring resolution (Δs) and the unique range are determined by the numeric values ($\Delta f_1$ and $\Delta f_2$) of the mode spacings of the two lasers 1, 2.

Figure 2A:
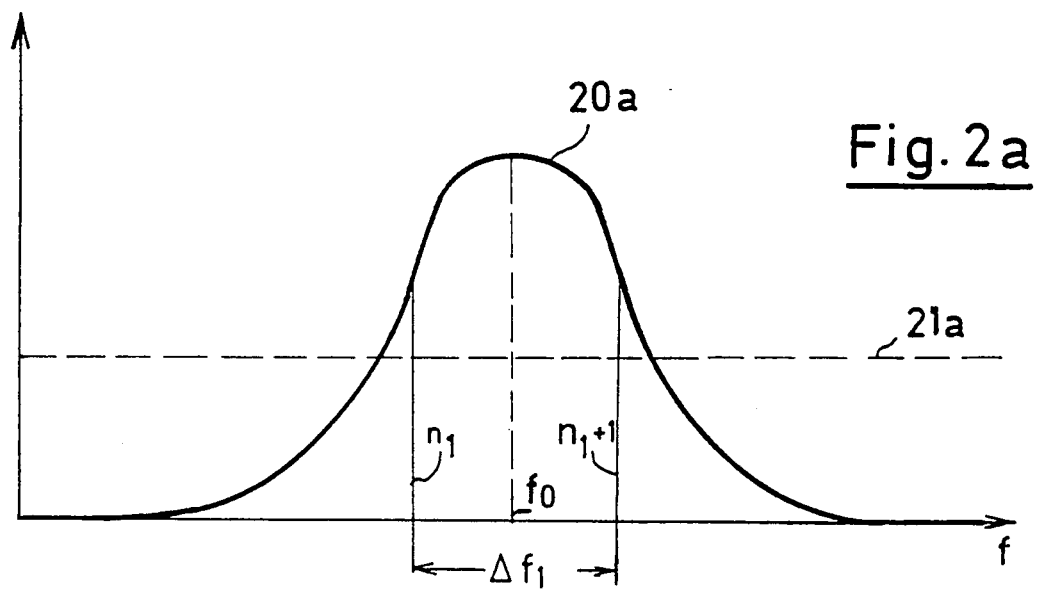
FIG. 2a is a graphic diagram of the amplification of the first laser of FIG. 1, shown as a function of the frequency.

FIG. 2a shows the spectral curve 20a of amplification of HeNe laser 1. The two adjacent longitudinal modes $n_1$ and $n_1 + 1$ are above the laser threshold 21a. The frequency spacing $\Delta f_1$ of the two modes is given by the resonator length $L_1$ of laser 1 and the speed of light c:

$$\Delta f_1 = c/2L_1$$

If the resonator length $L_1 = 25$ cm, then $\Delta f_1 = 600$ MHz. This is a so-called "random" polarized laser where the adjacent modes $n_1$ and $n_1 + 1$ are polarized perpendicular with respect to each other.

Figure 2B:
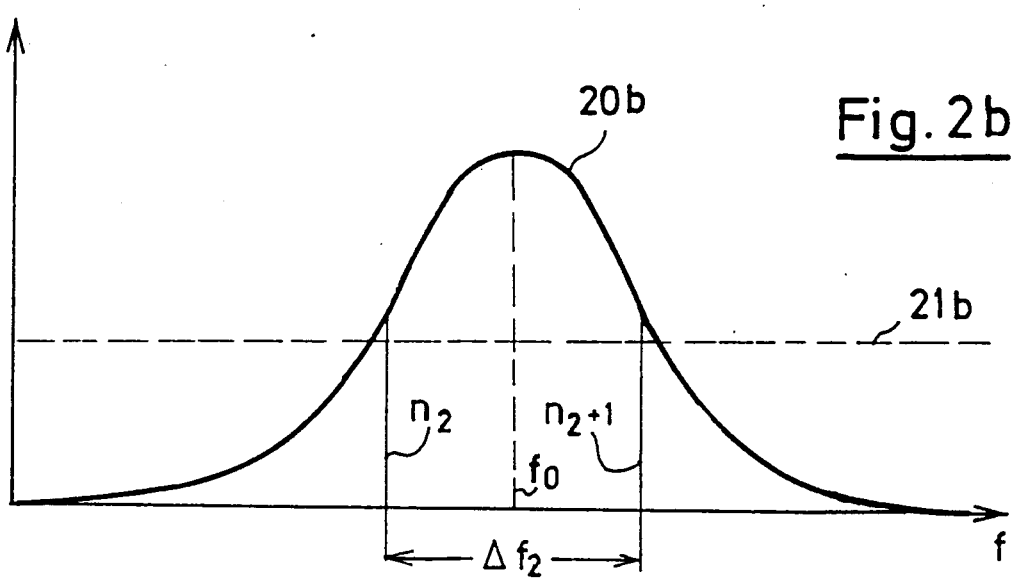
FIG. 2b is a graphic diagram similar to FIG. 2a and relating to the second laser of FIG. 1.

Analogously, this applies to HeNe laser 2 which has a spectral curve 20b of amplification as shown by FIG. 2b. This is also a two-mode "random" polarized laser with adjacent longitudinal modes $n_2$ and $n_2 + 1$ located above the laser threshold 21b. This second laser, however, has a resonator length $L_2$ which is 0.21 mm shorter than that of the first laser. Hence, the frequency spacing is $\Delta f_2 = c/2L_2 = 600.5$ MHz. The relative difference of the resonator lengths of the two lasers is approximately 1/1000. Such a pair of HeNe lasers may be selected from commercially-available inventories of standard laser manufacturers.

These two lasers produce a digital measuring accuracy $\Delta s = \pm 0.2$ mm within a unique range (L) of 300 m. The measuring period for an individual measurement, i.e., the time it takes the measuring beam to travel the 600-meter maximum distance to and from the target, is only 2 μs, during which time interval there are 1201 clocking pulses (based upon $\Delta f_2 = 600.5$ MHz).

In order to increase resolution even further, phase shift measurements may be made over many periods of the frequency difference $\Delta f_{12}$. When phase shifts are measured over ten cycles of the difference frequency, the digital resolution becomes $2\pi/12,010$, and the digital accuracy of the distance-measuring value becomes $\Delta s = \pm 0.02$ mm with a measuring period of 20 μs.

Statistical errors can be reduced by repeated measurement of the values $\phi_1$ and $\phi_2$ of the phase shift. Therefore, the digital phasemeter 38 in FIG. 1 may be provided with a switch which interchanges two measuring inputs 38a, 38b relative with respect to each other after each measuring cycle. In this manner, the influence of any systematic differences between the voltage comparators of digital phasemeter 38 can be suppressed.

A further feature of the invention concerns the correction of phase drifts between detector 28 and detector 34. Referring again to FIG. 1, another beam splitter 40 is provided in the path of rays 30 of the measuring light beam, being positioned in front of beam-splitting prism 31. Beam splitter 40 deflects a partial beam 43 of the measuring light 30 to the third detector 34. A second mechanical chopper 41 alternately interrupts this partial beam 43 and path 42 of the light reflected diffusely or specularly by target 33. During the time when chopper 41 permits passage of partial beam 43, a phase correction value $\phi_k$ is measured between the signals of detector 28 and detector 34. This phase correction value $\phi_k$ is subtracted from measured phase values $\phi_1$ or $\phi_2$.

When the distance to a diffusely-reflecting target is being measured, it is difficult to divide the measuring light 30 and the reflected light 42 by optical polarization, because diffuse reflection always has a depolarizing effect. Therefore, for diffusely-reflecting targets, geometric splitting of the beam is recommended; this may be accomplished, for example, with separate emission and receiving telescopes.

Mechanical choppers 25, 41 may be replaced by liquid crystal devices or even by electro- or magneto-optical switch elements. The latter are particularly preferable when short measuring times and thus high chopper frequencies are of importance.

Figure 3A:
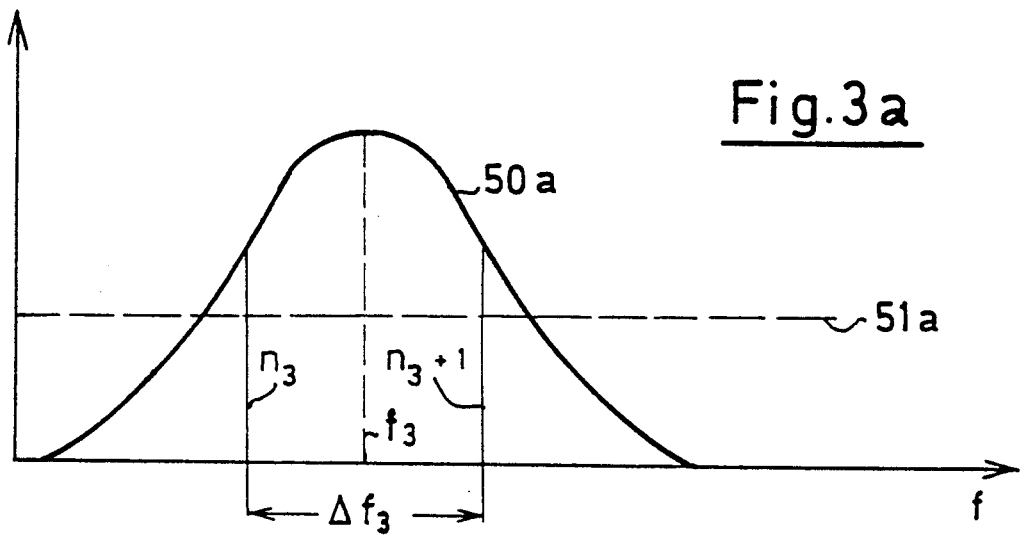
FIGS. 3a and 3b are graphic diagrams similar to FIGS. 2a and 2b, but relating to two different lasers which can be substituted in the device shown in FIG. 1.

A second embodiment of the invention uses two different lasers, the first of which is similar to the two-mode lasers described above. The spectral curve 50a of this similar laser is shown in FIG. 3a. The maximum amplification is at a frequency $f_3$. The two modes $n_3$ and $n_3 + 1$ are located above the laser threshold 51a. These two modes are polarized linearly perpendicular with respect to each other. The frequency spacing between the modes is $\Delta f_3$. The frequency of this laser is stabilized in accordance with the method and apparatus described above and shown in FIG. 1.

Figure 3B:
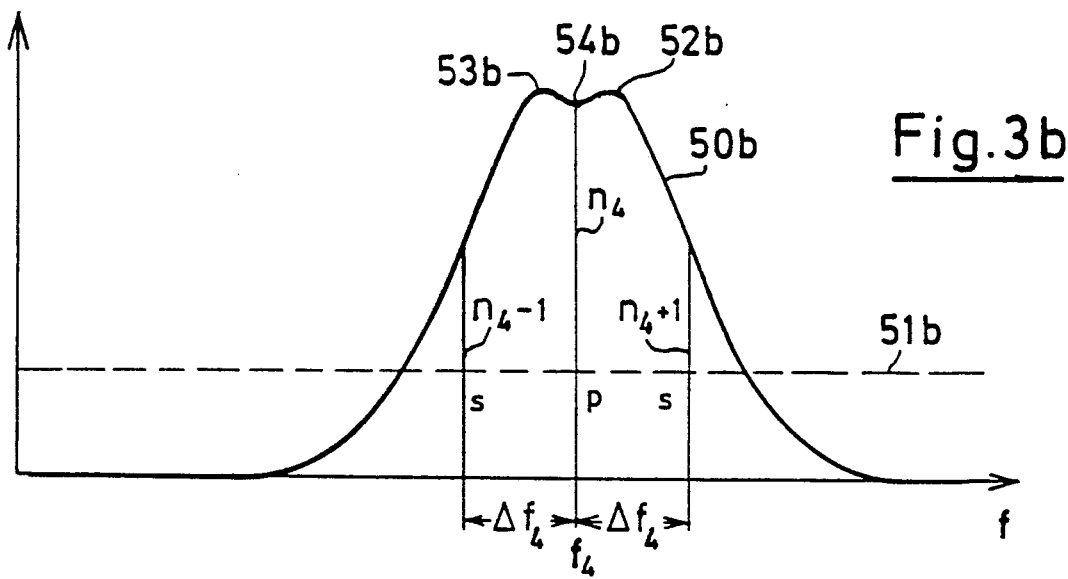

However, the second laser in this second embodiment has three modes as indicated in FIG. 3b. The three modes $n_4 - 1$, $n_4$, and $n_4 + 1$ are all located above the laser threshold 51b. The mode $n_4$ is polarized linearly perpendicular to the other two modes. The frequency spacing of modes $\Delta f_4$ is less than $\Delta f_3/2$. The spectral curve of amplification 50b has a minimum 54b between the two maxima 52b and 53b, said minimum being called the "Lamb-Dip". A polarization beam splitter divides the modes of the laser beam in accordance with their polarization. The two modes $n_4 - 1$ and $n_4 + 1$ are used to form the amplitude-modulated measuring beam, being superimposed to generate a modulation frequency $2\Delta f_4$, while the intensity of mode $n_4$ is measured and used to stabilize the laser. A controller adjusts the resonator length by means of piezoelectric elements so that the frequency of the mode $n_4$ coincides with the frequency of the Lamb-Dip, thereby maintaining the intensity of the mode $n_4$ at a minimum.

With the exception of the just-described stabilization arrangement for the second laser, the second embodiment is identical to that shown in FIG. 1.

I claim:

1. In an optical distance-measuring device having a light source for emitting a light beam which is directed at a distant target, means for receiving reflections of said light beam from said target, and means for detecting phase shifts between said emitted and reflected beams, the improvement wherein:

said light source comprises two multi-mode lasers and said device further comprises means for superimposing at least two modes of each said laser to produce a pair of amplitude-modulated laser beams, each of said modulated beams being directed at said target.

2. The optical distance-measuring device of claim 1 wherein the frequency difference between the modes of each laser is, respectively, $\Delta f_1$ and $\Delta f_2$, and wherein said frequencies are selected so that the ratio $\Delta f_1/\Delta f_2$ differs from a whole number by an amount which is small relative to the number one.

3. The optical distance-measuring device of claim 2 wherein the ratio $\Delta f_1/\Delta f_2$ differs from the number one by less than 1%.

4. The optical distance-measuring device of claim 3 wherein the frequency difference between said amplitude-modulated laser beams is less than or equal to 1 MHz.

5. The optical distance-measuring device of claim 1 wherein each said laser has two modes.

6. The optical distance-measuring device of claim 1 wherein one of said multi-mode lasers has three modes and the spectral curve of said three-mode laser has two maxima separated by a "dip" region, one of said three modes being the minimum frequency within said dip region.

7. The optical distance-measuring device of claim 1 further comprising closed-loop means for stabilizing the spectral frequencies of each superimposed mode of each said laser.

8. The optical distance-measuring device of claim 1 further comprising:
three detectors for converting amplitudemodulated light into electrical pulse trains, a first one and a second one of said detectors each receiving a portion of the beam emitted by a respective one of said lasers, and the third of said detectors receiving said reflections from the target; and
first switching means for alternately directing (a) a portion of the amplitude-modulated beam emitted from each respective laser to said target and to said first detector so that said target and said first detector receive only the beam from one of said lasers at any one time, and simultaneously (b) a portion of the beam of the other of said lasers to said second detector, and wherein
said phase-shift detection means is responsive to electrical pulse trains generated by said detectors for (a) electronically mixing the pulse trains related to said modulated light beams emitted by both said lasers and (b) detecting the shift in phase between the pulse trains related to the emitted and reflected beams of one of said lasers.

9. The optical distance-measuring device of claim 8 wherein said phase-shift detection means includes clock means having a frequency set by the pulse train generated in response to the amplitude-modulated light beam of one of said lasers.

10. The optical distance-measuring device of claim 8 wherein said first switching means comprises a mechanical chopper.

11. The optical distance-measuring device of claim 8 further comprising:
beam-splitting means, arranged in the path of the beam being directed at said target by said first switching means, for directing a portion of that beam to said third detector; and
second switching means, positioned between said third detector and said beam-splitting means and between said third detector and said means for receiving reflections from said target, for alternately exposing said third detector to (a) beams directed to it by said beam-splitting means and (b) said reflections from said target, and wherein
said phase-shift detection means receives said alternately generated signals from said third detector and compensates for phase drifts between said third detector and said first detector.

12. The optical distance-measuring device of claim 11 wherein said second switching means comprises a mechanical chopper.

13. The optical distance-measuring device of claim 1 wherein each of said amplitude-modulated beams is alternately directed at the target.

* * * * *